United States Patent [19]

Meichsner et al.

[11] 4,033,868
[45] July 5, 1977

[54] METHOD AND APPARATUS FOR PROCESSING CONTAMINATED WASH WATER

[75] Inventors: Othmar Meichsner, Raunheim; Horst Queiser, Hochstadt, both of Germany

[73] Assignee: Licentia Patent-Verwaltungs-G.m.b.H., Frankfurt am Main, Germany

[22] Filed: Oct. 29, 1974

[21] Appl. No.: 519,020

Related U.S. Application Data

[63] Continuation-in-part of Ser. No. 353,114, April 20, 1973, abandoned, which is a continuation-in-part of Ser. No. 119,339, Feb. 26, 1971, Pat. No. 3,773,177.

[30] Foreign Application Priority Data

Mar. 27, 1974 Germany .......................... 2414728
Mar. 27, 1974 Germany ....................... 7410691[U]

[52] U.S. Cl. .................. 210/38 C; 210/68; 210/70; 210/73 R; 210/75; 210/193; 210/200; 252/301.1 W; 423/7

[51] Int. Cl.² ........................ B01D 37/02
[58] Field of Search .............. 210/24, 38, 68, , 70, 210/71, 73, 189, 198, 200, 252, 75, 331, 75, 167, 193; 252/301.1 W; 423/6, 7

[56] References Cited

UNITED STATES PATENTS

| | | | |
|---|---|---|---|
| 2,455,130 | 11/1948 | Lomax | 210/75 |
| 2,616,847 | 11/1952 | Ginell | 252/301.1 W |
| 3,196,106 | 7/1965 | Haden et al. | 210/24 |
| 3,360,869 | 1/1968 | Müller | 210/68 |
| 3,520,805 | 7/1970 | Ryan | 210/73 |
| 3,764,553 | 10/1973 | Kirby | 252/301.1 W |
| 3,773,177 | 11/1973 | Queiser et al. | 210/68 |

*Primary Examiner*—Frank A. Spear, Jr.
*Assistant Examiner*—Peter A. Hruskoci
*Attorney, Agent, or Firm*—Spencer & Kaye

[57] ABSTRACT

Contaminated wash water in nuclear plants are processed by mixing the wash waters with ion exchange resins to form a suspension and then feeding the resulting suspension to a filter.

27 Claims, 2 Drawing Figures

METHOD AND APPARATUS FOR PROCESSING CONTAMINATED WASH WATER

CROSS REFERENCE TO RELATED APPLICATIONS

This application is a continuation-in-part of Application Ser. No. 353,114, filed Apr. 20, 1973 now abandoned, which in turn is a continuation-in-part of application Ser. No. 119,339, filed Feb. 26, 1971 and now U.S. Pat. No. 3,773,177. The entire disclosure, text and drawing of these applications, as well as publications cited therein, are incorporated herein by references.

BACKGROUND OF THE INVENTION

The present invention relates to a method and apparatus for processing contaminated wash waters.

In nuclear plants, particularly nuclear power plants, waste water which contains impurities is present at many places. These impurities must be removed from the waste water before the waste water can be recirculated or before it can be discharged to the environment. These impurities are usually radioactive and are either bound to solid components contained in the water or to ionically dissolved substances. The plant which treats such waste water is called a waste water processing plant system, or simply, a a processing plant. Such waste water processing plants, are described, for example, in *Atomwirtschaft*, 1968, page 149, FIG. 6; in an article entitled "Abfallbehandlung" (in translation — WASTE TREATMENT) which appeared in *Atomwirtschaft*, Nov. 1965, pages 624–626, especially paragraph 2 of page 626; and in the collection "Power Plant and Environment 1973", published by VGB — Technische Vereinigung der Grosskraftwerksbetreiber e.V. (in translation — ASSOCIATION OF OPERATORS OF LARGE POWER PLANTS).

For economical reasons, and as described, for example, in the article "Abfallbehandlung" in the November, 1965 issue of *Atomwirtschaft*, processing of radioactive liquid wastes, for instance those occurring in nuclear power plants, is usually effected in three processing lines:

1. Filtration through mechanical filters with the filtrate being then passed through ion exchangers;
2. Concentration in evaporators;
3. Filtration only through mechanical filters.

The first-listed processing line is used for the waste waters from the nuclear cooling system and from the condensation system (these waters make up 60% to 70% of the total waste water load).

The second-listed processing line is used for sump waters, laboratory waste waters, and decontamination waters from the entire control region (about 20% to 30% of the total waste water load).

The third listed processing line is used for cleaning wash waters from washing machines, showers, and hand-washing basins, as well as inactive laboratory waters from the control region (about 5% to 10% of the total waste water load).

From these water-processing steps and other cleaning operations large amounts of radioactive concentrates arise. Thus, for example, the impurities that are removed by the filters and evaporators collect in the filters and evaporators as concentrates or residues which generally contain a liquid component. Efficient service organizations for collecting and treating these concentrates do not exist. A storing of these concentrates in liquid form is presently not possible. The processes used in Europe for handling these concentrates involve the use of additive materials, such as bitumen, concrete, oil shale ash, and bone size. These add to the total volume of the final material to be disposed of. They have often required too great of a capital investment.

The storing of these concentrates for the purpose of allowing radioactive decay to run its course requires considerable capital expense, especially where waste quantities are large, such as in the case of large power plants. It therefore becomes worthwhile to dewater and solidify such concentrates.

In efforts thus far made toward dewatering and solidification, a number of problems have arisen which have to this time prevented widespread acceptance. Among the problems are the following:

1. The concentrates are very variable in their compositions. A primary problem here is that waste from resin-bead ion exchange filters cannot be dewatered with a usual filter-cake-producing filter, because the resin beads as a result of their shape do not remain lying on the filter cloth or septum especially once their moisture content has sunk below a certain level. Because of this problem, filter-cake-producing filters have been automatically dropped from consideration whenever concentrate-containing resin beads must be dewatered.

2. The concentrates have very different activity loads.

3. The dewatered and solidified material must satisfy current governmental requirements for the storage of radioactive wastes.

4. The packaging must meet requirements for the transport of dangerous materials as set for international railroad freight traffic.

The previously-noted parent application Ser. No. 119,339, now U.S. Pat. No. 3,773,177, discloses a method for treating various radioactive concentrates or residues containing liquid components, which concentrates or residues are separately produced in a nuclear processing plant in an evaporation concentrator, in resin-bead ion exchange filters and in at least one further separator, including, for example, mechanical filters, settling vessels and/or powdered-resin ion exchange filters. According to the parent application Ser. No. 119,339, now U.S. Pat. No. 3,773,177, residues from the resin-bead ion exchange filters are mixed with those of the further separator stage and are dewatered in a residue filter, while residue from the evaporation concentrator is dewatered directly in transporting and storage vessels to the dryness required for storage. A relatively small volume of residue is obtained by this method without any additional materials.

When dealing with concentrates containing used resins, chemicals can be employed to reduce the volume of the used resins but use of chemicals would result in dumping a substantially larger amount of radioactive waste water (water having a high conductivity) e.g., into streams, and would increase the cost for process components and chemicals.

As has been previously mentioned, among the waste waters which must be processed in the waste water processing plant are the wash waters. These wash waters include the waters from showers that people in the plant use after they have worked in the plant, from the hand wash basins that people use to wash their hands and from washing machines that wash the contaminated clothing of the persons working in the plant.

In the past, two methods with different degrees of efficiency have been used to process these waste wash waters. In the first method, the wash waters have been concentrated in evaporators in accordance with the second-listed processing line described above. In the evaporation method, it is presently possible to attain residual activities in the distillate at the power plants of about $10^{-5}$ Ci/m$^3$ pretty much independent of the initial activity. An example of the use of evaporators for wash waters is shown in FIG. 6 of the above-mentioned 1968 issue of *Atomwirtschaft*. In the second method, the waste wash waters are processed in accordance with the third-listed processing line described above in which there is a filtration method only through mechanical filters. These mechanical filters contain auxiliary filtering aids, such as kieselgur. When using this filtration method, an activity of between $10^{-3}$ and $10^{-4}$ Ci/m$^3$ can be attained depending on the initial activity.

The evaporation method for processing waste wash waters is practiced with the aid of special decontamination evaporators and is very advantageous with respect to its purifying effect. However, it has a number of economical and operational drawbacks when employed for processing waste wash waters. These drawbacks include: (a) high consumption of heating steam or, when the condensation heat of the vapors is utilized, high investment costs; (b) relatively small throughput since the size of the plant is kept as small as possible because of the high investment costs involved; (c) development of a preconcentrate which contains radioactivity and which must be processed in a subsequently connected separate system until it has become a packable dry residue; and (d) operational problems in the evaporation of the wash water caused by the formation of foam from the detergents, clogging of the heating registers and control devices and valves by lint and crusting as well as a required chemical cleaning of the apparatus.

The filtration method for processing waste wash waters is still used quite often but does not operate very efficiently and has a number of drawbacks. First, the filtration method usually provides an insufficient decontamination effect (decontamination factor 10), since only the activities bound to solid matter are removed from the water. The activity bound to dissolved substances remains in the filtrate. The decontamination efficiency is particularly inefficient at the higher general activity level that occurs during the change of fuel elements and with the special generally occurring particular isotope combination of the wash water. Second, there is a poor filterability with and therefore high consumption of filtering aids resulting in a corresponding high cost of operating agents and relatively large filter surfaces. The filtering speed is usually less than 1 m$^3$/m$^2$/h.

Additionally, the previously employed filtering aid kieselgur is not too well suited for filtration of concentrated warm wash waters from washing machines because it fails to maintain a stable structure under prevailing conditions. Further, there generally is an excess of detergent in such a wash water and soapy, flaky and fibrous components require the amount of kieselgur to be added during filtration to be very high and thus the quantity of active residues to be treated in the concentration processing system is increased by a high percentage.

SUMMARY OF THE INVENTION

It is a primary object of the present invention to provide a method for processing contaminated wash water which will avoid the above-mentioned drawbacks and will be very efficient and economical resulting in savings of operating agents and energy and a reduction of the size of the apparatus required for processing contaminated wash waters.

This is accomplished according to the present invention by mixing the contaminated wash waters with ion exchange resins in a mixing vessel to form a suspension and then feeding the resulting suspension into a filter.

The method according to the present invention thus is a combination of ion exchange and filtration. The usually predominant portion of ionic, radioactive substances is removed from the wash water in the mixing vessel by the ion exchange resin. On the other hand, the solid matter in the wash water is removed from the wash water by being retained on the filter when the suspension of wash water and ion exchange resin is fed to the filter. The wash water leaving the filter is thus freed of both ionically dissolved radioactive contaminants as well as radioactive solids suspended in the wash water. Generally, no ionic cleaning occurs in the filter, and the ion exchange resin in the suspension serves as a filtering aid on the filter for mechanically filtering solid substances from the suspension.

The mixing of the wash water with the ion exchange resins is distinguished from typical ion exchange processes where waste water usually is processed in a straight-through operation, that is, the water is continuously passed or flowed through a bed of ion exchange resin and removed therefrom. In contrast, in the present invention, the water and ion exchange resin are mixed to form a batch suspension and this suspension is left for a period of time so that the ion exchange resin and water contact each other for a substantial time and a thorough ion exchange is effected. By mixing the resins which cause the exchange of ions with the wash water, optimally required contact periods for the exchange of ions can be set. This permits a much better utilization of the total exchange capacity of the resins than would be possible in the conventional straight-through operations. Usually, a contact period of 15 to 20 minutes is sufficient and optimal to achieve the desired ion exchange. The mixing vessel contains no filter plates or the like, but is simply a container in which ionic cleaning takes place.

In accordance with a preferred embodiment of the invention, waste ion exchange resins which can no longer be used in straight-through operation or which are not as yet fully spent are used to treat the waste wash waters. Waste ion exchange resins can be used in the present invention because of the long contact time of the resin with the wash water in the mixing vessel.

The decontamination effect realized in the method according to the present invention for wash waters from nuclear power plants can be equated to the evaporation method previously used for wash waters since decontamination factors of from $10^3$ up to $10^5$ and residual activities of $10^{-5}$ to $10^{-6}$ Ci/m$^3$ are realized.

It is to be understood that both the foregoing general description and the following detailed description are exemplary and explanatory but are not restrictive of the invention.

BRIEF DESCRIPTION OF THE DRAWINGS

The accompnaying drawings illustrate examples of the presently preferred embodiments of the invention and together with the description serve to explain the principles of the invention.

Of the drawings.

DETAILED DESCRIPTION OF THE INVENTION

In accordance with the invention, the contaminated wash waters are mixed with ion exchange resins. The contaminated wash waters are the untreated wash waters produced in showers, hand wash basins and washing machines. The wash waters from these individual sources are contaminated to different degrees. Thus, the heaviest contamination is present in the water from the hand wash basins and in the wash water from the washing machines. The waste wash waters from the showers and the rinse water from the later cycles of the washing machines are only very slightly contaminated, if at all.

In accordance with a preferred embodiment of the invention, the wash waters with different degrees of contamination are separated and only the more heavily contaminated wash waters are mixed with the ion exchange resin. The slightly contaminated wash waters are collected in a vessel and, depending on their degree of contamination, can be discharged directly without going through the processing system or can be treated in a known, conventional manner in the waste water processing system by evaporation or filtration. This separation of the wash waters into slightly and heavily contaminated streams enables the throughput for the system according to the present invention to remain as small as possible so that the system can be designed as small as possible for economical reasons and does not require as much ion exchange resin as would be the case if no separation of the wash waters takes place.

As is well known, the washing machines contain a number of different cycles including a prerinse cycle, a main washing cycle, and a plurality of rinse cycles. The more strongly activated wash waters from the washing machines which contains a very large proportion of solids come from the prerinse cycle, the main washing cycle and the first two rinse cycles and accordingly it is preferred to program the washing machines so that only the more strongly active wash waters from these cycles are mixed with the ion exchange resins in accordance with the present invention. This separation of the waste waters from the washing machines into the more strongly active wash water which contains more than 90% of the radioactivity and into the rinse waters from the later cycles which are only slightly soiled and contaminated results in substantial advantages for the decontamination process. The ratio of the more strongly active wash water to rinse water in the rinsing cycle, depending on the cycle selected, is about 1:3. With reference to about 40 m$^3$ of waste water from washing machines per day as is encountered in the larger nuclear power plants during revision periods, only 10 m$^3$ per day needs to be treated according to the preferred embodiment of the invention where the wash waters of the washing machines are separated according to their degree of contamination. The rest, that is, the rinse waters from the later rinsing cycles, can often be discharged directly or can be treated in the known manner by evaporation or filtration without encountering the drawbacks inherent in treating heavily soiled wash waters by these methods.

The ion exchange resins that are mixed with the wash waters can be powdered resins or beaded, spherical resins. In both cases, new resins or used resins which can no longer be used otherwise can be mixed with the wash waters. The powdered resins are finely divided resins and generally have a size range of from 0.035mm to 0.25mm. Powdered resin sizes such as about 0.05mm are preferred. The larger beaded resins generally have a size range of from about 0.3mm to 1.2mm. Beaded resins having a major proportion of their size in the range of from about 0.34mm to 0.8mm are preferred.

In a preferred embodiment of the invention, used resin, particularly powdered resin as it is produced in large quantities as a waste product of condensate purification systems in boiling water nuclear power plants, is mixed with the waste wash water to provide a particularly economical process. The following further advantage develops from the use of used ion exchange resin: The powdered resins used in a nuclear power plant with boiling water reactors for purifying the condensate in accordance with processing line 1, described above, are exhausted only to a very small degree of their useful volume capacity because of the high condensate quality required. Because of the electrostatic effect, a large volume of silt (residue) is produced of which the solids amount to only about 5 to 10 percent by weight. This has an adverse influence on the storage capacity for processing the residues. It would be conceivable to reduce the volume of the old resins and exhaust them by addition of chemicals. However, this use of chemicals would result in increased quantities of radioactive water having a high conductivity discharged into the river and increased costs for the process components and the chemicals. By mixing the used resins with the untreated wash water or by using the used resins as a filtering aid for the wash waters present anyhow, the used resins are exhausted without any further additives and the residue volume is reduced by the factor 2 to 4. In addition to the advantage that no additional new resin will them be required, there results the advantage that the old resins are influenced in a favorable manner with respect to their processing.

The significant effect of the present invention is the combination of the ion exchange in a mixing vessel and the subsequent filtration. By mixing the wash waters with the resins in a mixing vessel, the usually predominant portion of the ionic radioactive substance is removed from the wash water. In the subsequent filtration process with the resins as the filtering aid, the solids suspended in the wash water are retained on the filter.

The untreated contaminated wash waters are mixed with the resin preferably in a volume ratio of wash water to resin-water at which the resin-water includes 10 percentage by weight of resin. Of about 2:1. When more resin is used, the result is only a little better, with more wash water the result becomes quickly worse. When the wash water is mixed with used resins, such as used powdered resins, it is preferable to use fully desalted water as the wash water because this permits the ratio of wash water to powdered used resins to be increased substantially. The resin and the wash water are subjected to intensive stirring to form a well mixed suspension. Generally, stirring is conducted for about 15 to 20 minutes so that the resin and wash water have a contact period of preferable 15 to 20 minutes in the mixing vessel.

The Method according to the present invention produces a regulation of the pH of the wash water which makes neutralization by means of chemicals unnecessary before the water is discharged to the environment.

In accordance with the invention, the suspension of resin and wash water is fed to a filter. Upon completion of stirring of the waste wash water and the resin in the vessel, the suspension of resin and wash water is fed to a filter. Preferably a filter-cake-producing residual-filter is used. The term "filter-cake-producing residual-filter" is used herein to distinguish from those filters which operate exclusively by ion-exchange capture of the substance to be filtered out. A preferred filter-cake-producing-residual-filter is that described in U.S. Pat. No. 3,773,177. During the filtering step of this invention, the ion exchange resins and solid radioactive substances in the wash water are filtered from the wash water and form a filter cake. The ion exchange resins in the wash water serve as a filtering aid for the filter. The filter cake formed on the filter preferably is dried in the filter itself and can be packed from there directly for permanent storage. This eliminates, in contradistinction to the known evaporation method for wash waters described above, the additional apparatus for drying the residues.

The suspension resulting when the wash water is mixed with the resin requires, contrary to the known filtration method for wash water described above, no continuous addition of filtering aids during the filtering process. The latter would increase the solid radioactive residue from the wash water by the factor 2 to 3 in volume and when old resins are used according to a further feature of the present invention the operating expenses for these filtering aids are also eliminated.

If the resin/wash water suspension is filtered through a suspension residual filter, this results in a looser filter cake so that a filtering throughput of about 5 to 10 $m^3/m^2$ can be attained. This requires a much smaller filter for the same throughput as in the prior art filtering method described above for wash water, or with the same size filter a much shorter filtering period.

The waste wash water from the vessel can be the only material that is being filtered by the filter or other materials can be filtered simultaneously with the waste wash water. In one embodiment of the invention, the filtering step for the waste wash water is combined with the filtering step employed in the above-mentioned application Ser. No. 119,339, now U.S. Pat. No. 3,773,177, in which a mixture of (1) a radioactive concentrate from a resin-bead ion exchange filter and (2) a radioactive concentrate having particles of a size smaller than that of the resin beads in the resin-bead ion exchange filter and having a salt content less than that of a radioactive concentrate from an evaporator concentrator is dewatered by filtering in a filter-cake-producing filter. Thus, the waste wash water treated with ion exchange material can be filtered along with the just-described mixture of radioactive concentrates.

EXAMPLE 1

Figure 1:
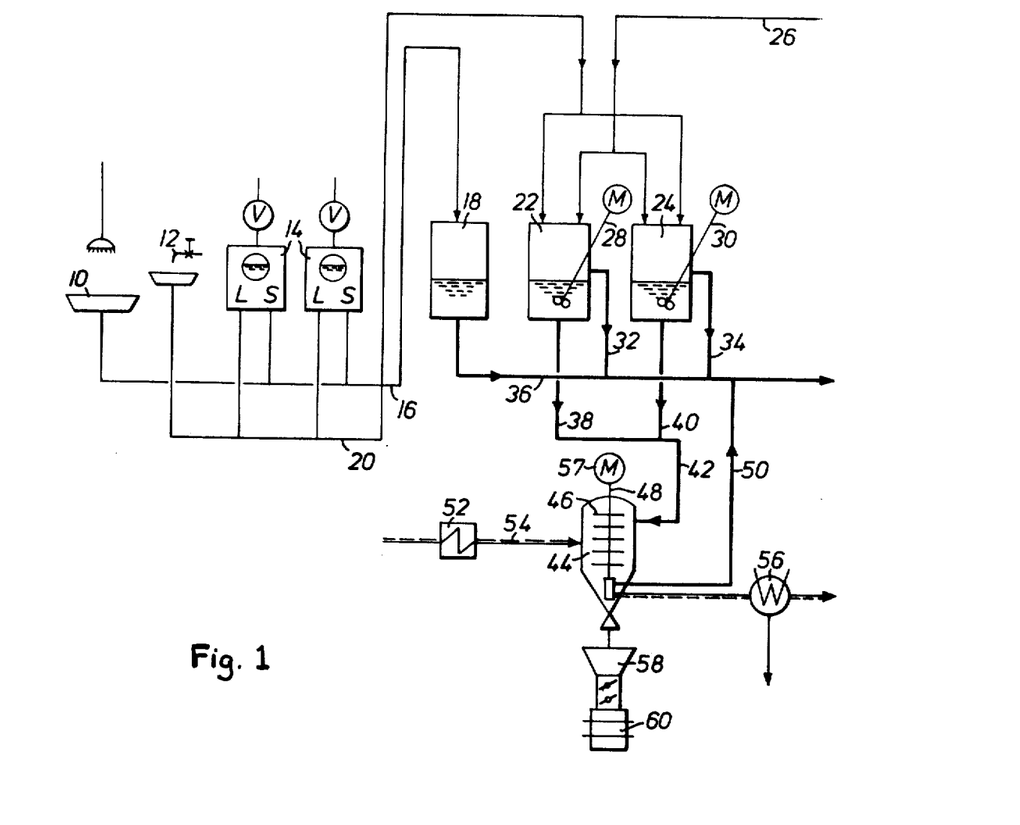
FIG. 1 is a schematic view of a processing system made in accordance with the teachings of this invention.

FIG. 1 shows the processing of waste wash waters from a nuclear power plant as well as the treatment of the residues resulting therefrom. The other parts of the waste water processing system are not shown in FIG. 1 nor is the system for processing the residues resulting therefrom. Any of the previously mentioned known prior art systems can be used for this purpose.

Contaminated wash waters are produced in showers 10, hand wash basins 12 and washing machines 14. The wash waters from the individual sources are contaminated to different degrees. Thus, the heaviest contamination is present in the water from hand wash basins 12, and in the wash water from washing machines 14. The waste waters from showers 10 and the rinse water from washing machines 14 are only very slightly contaminated, if at all. The wash waters having different degrees of contamination are separated so that the throughput for the system according to the invention remains as small as possible. The system therefore can be designed as small as possible for economical reasons and does not require as many ion exchange resins. The wash water and the rinse waters from the washing machines 14 are separated in this case by a valve (not shown) controlled by the program of the washing machine.

The slightly contaminated wash waters from showers 10 and the later rinse cycles of the washing machines 14 are fed to a collecting line 16 which opens into a vessel 18. Depending on the contamination at hand, this water can be discharged directly without going through the processing system or it is treated in a known manner in the waste water processing system by evaporation or filtration, respectively.

The more heavily contaminated wash waters from hand basins 10 and washing machines 14 are fed into collecting line 20 which in the illustrated embodiment opens into two mixing vessels 22 and 24. Resin ion exchange material is fed through line 26 into the vessels 22 and 24. These resins are stirred intensively in the two vessels 22 and 24 to mix with the contaminated wash waters by means of stirrers 28 and 30, respectively. The volumetric mixing ratio of wash water to resin-water is preferably 2:1. Upon completion of the stirring process, the optimum contact period may be permitted to expire before the solid components, i.e., the active contaminated particles in the wash water and the resins which now have removed the ionic radioactive substances from the wash water, have settled to a certain degree. Then, part of the vessel content is removed through lines 32 and 34 by decanting and is discharged into collecting lines 36 for the usual waste water processing in the straight-through method. Alternatively, the decanted waste wash water can be discharged directly since this part of the water is generally only very weakly contaminated. Vessels 22 and 24 are connected in such a way that the settling process takes place in one vessel, while wash water is fed into the other vessel. This assures continuous operation.

(*) at which the resin water includes 10 percentage by weight of resin.

In order to process the residue contained in vessels 22 and 24, this residue is fed via lines 38 and 40, which open into a collecting line 42, to a filter 44. This filter 44 is advisably a filter-cake-producing residue-filter, and preferably consists of a plurality of plate-shaped filter elements 46, which are supported by a vertical hollow shaft 48. Filter cake forms on the upper sides of the plates. The filtrate is drawn off through hollow shaft 48 and fed into the waste water processing system via a line 50.

In order to prevent radioactive solids from getting into the filtrate, filter 44 can be first provided in a known manner with a basic settling layer in the form of a precoat of fibrous material, such as cellulose fiber, before actual filtration begins. To this end, a precoat tank (not shown) can be connected in an auxiliary circuit with filter 44. The fibrous material is first thoroughly mixed with water in the precoat tank; then this fiber-laden water is pumped into filter 44 while a suction is being applied to shaft 48 whereby the precoat is formed on the filter cloths or septa of the elements 46. An example of a suitable fibrous material is clean, fibrous cellulose material designated as Type BW 100 (cotton fibers of one millimeter length). During drying, this cotton fiber precoat gives an effect equal to a paper filter and acts to filter out aerosols.

The cotton fibers are added to water in the precoat tank until they amount to 3 to 4 weight-% of the weight of the water. A homogenizing period during which the fiber-water mixture is circulated through the filter and the precoat tank assures a uniform precoat layer thickness of about 0.8 millimeter.

The resin/wash water suspension arriving through line 42 is fed to the plate-shaped elements 46 which have been provided with a basic settling layer of fibrous material as just noted. A filter cake containing the ion exchange resins forms on the filter and serves as a filtering aid for filtering out the solid components of the wash water. When filter 44 has been sufficiently charged, it is preferable to dry the filter cake on filter plates 46 with hot air which is blown into filter 44 by a heater 52 through line 54. Filter 44 is preferably steam-heated during this period. The moisture of the drying air finally provides a measure for the dryness of the filter cake. The drying air is then fed through a cooler 56 and a filter in the exhaust system which is already provided.

Preferably, hollow shaft 48 can be rotated by means of a motor 57. Rotation of filter plates 46 permits the filter cake to be removed from filter plates 46. The filter cake is flung centrifugally from filter plates 46 and falls into a resdiue bin 58 which is pivotally disposed below filter 44. This residue bin 58 is provided with a solid matter discharge and metering device which measures the dried solids as to volume and fills them into a vat 60 which is then placed into permanent storage.

An example of filter 44 is a steam-heated filter obtainable under the designation "Funda-Rueckstandsfilter $^{R10}$" from Chemap AG, Maennedorf/Zuerich, Alte Landstr. 414. Another example of filter 44 is that described on pages 19–72 and 19–73 of "Chemical Engineers' Handbook", by John H. Perry, McGraw Hill Book Co., New York (4th Ed., 1963) under the heading "The Rodney Hunt Pressure Filter". The filters preferably employed are the just-mentioned FUNDA residue filters. These filter have the advantage that the filtration and drying of the residues can be effected in the same outwardly sealed apparatus, the solids can be collected into large filter cake layers, the filtration and drying process can be interrupted at any time without incurring damage, the expulsion of the solids from the filter plates is possible in any easy manner by rotating the plates and the discharge is enhanced by the special structure.

However, other methods for processing the filter cake produced in filter 44 are also conceivable.

EXAMPLE 2

If the nuclear plant in which waste wash waters are encountered includes a concentration processing system according to U.S. Pat. No. 3,773,177, the residue filter present in the system disclosed in this patent can be used as the filter 44 for the process of the present invention. This example illustrates such a system with reference to FIG. 2.

Figure 2:
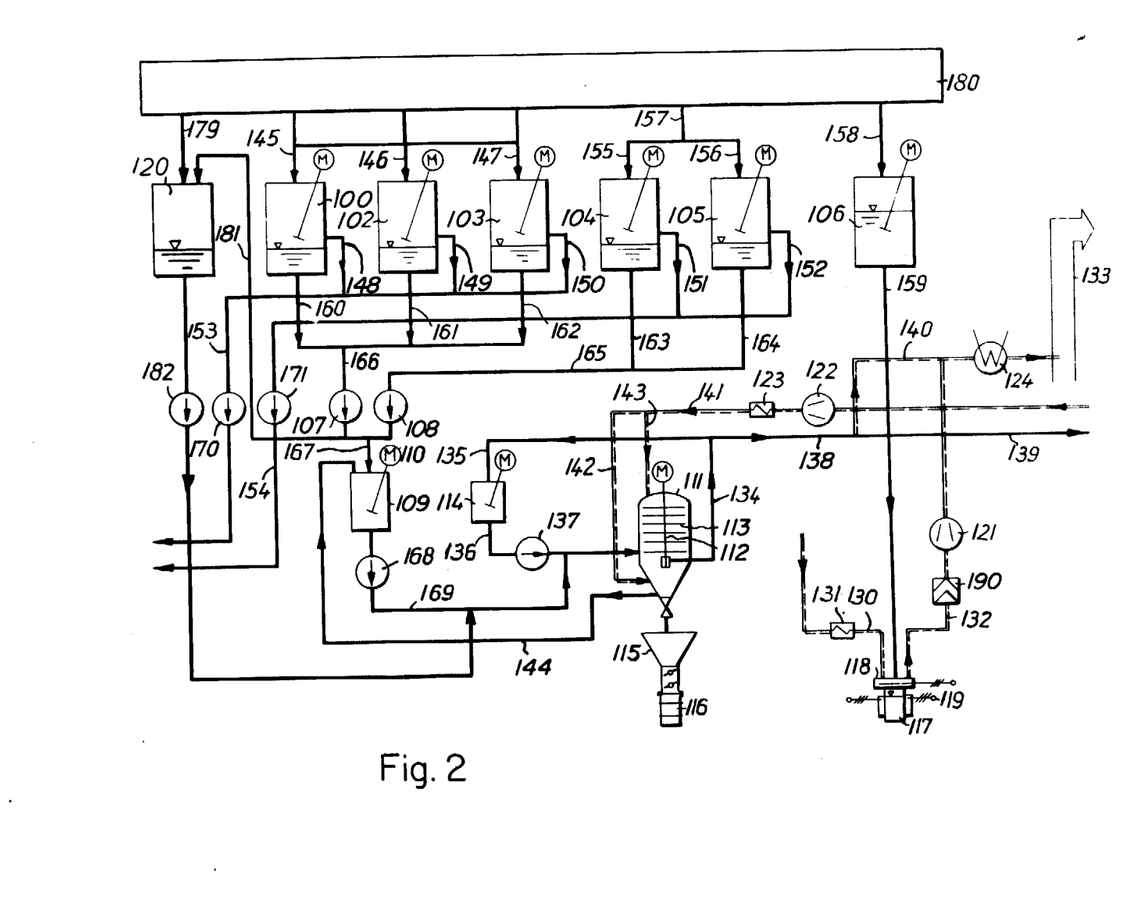
FIG. 2 is a schematic view of an alternate processing system made in accordance with the teachings of this invention.

According to the embodiment shown in FIG. 2, nuclear plant wash-water column waste water is mixed with powdered resin from a nuclear plant powdered-resin ion exchange filter and the resulting admixture is dewatered in a filter-cake-producing filter used for dewatering radioactive concentrate from a nuclear plant resin-bead ion exchange filter and from further nuclear plant residue separators other than evaporation concentrators.

By directly and separately (i.e., in a separate vessel) mixing waste water of the nuclear plant washing column with powdered resin which has been used in a powdered-resin ion exchange filter and thereafter filtering the thus-obtained admixture in a residue filter (111), the radioactive residue volume is reduced.

The powdered stored (used) resin is stable with respect to concentrated liquor and has a useful capacity up to about 70%. By using the stored resin as filter aid for wash water, the quantity of radioactive residue is substantially reduced and the wash water is decontaminated by first ionic and then mechanical cleaning. The stored resin is exhausted by this treatment and its "mud" volume is reduced by about a factor of 4. The complete exhaustion of stored resin additionally results in decontamination of the wash water by a factor of about 1000 which is particularly welcome in view of the goal of developing "zero release" systems. Additionally, this treatment results in regulating pH of the wash water and eliminates the need for neutralization of chemicals before release. Since the quantity of powdered stored resins is usually not sufficient for all of the water passing through the wash water column, the washing machine program can be controlled as previously described so that only more strongly active water which contains a high proportion of solids is separately collected and treated with the used powdered resin.

The schematic diagram of FIG. 2 illustrates a treatment plant for practicing the present invention on the waste concentrates from a large light-water nuclear power plant 180 using a boiling water reactor manufactured by AEG-Telefunken. Containers 101 through 105 are sedimentation tanks. Container 101 carries concentrate entering through pipeline 145 and resulting from condensate cleaning. Container 102 collects concentrate from pipeline 146 resulting from mechanically filtering wash water coming from the entire control region. Container 103 has a resin-bead concentrate from mixed bed ion exchange filters entering through pipeline 147. Containers 104 and 105 contain concentrate resulting from cleaning reactor water. Container 106 collects concentrate from an evaporation concentrator, as contrasted with containers 101 to 105 whose concentrates result from filtering operations.

Exemplary data concerning the concentrate compositions of the various containers is given in Tables I to III.

Table I

| Concentrate Compositions | Relative Slurry Volume | Solids in Slurry | Period* | Solids Type |
|---|---|---|---|---|
| 1. Filter Concentrates | | | | |
| a) Container 101 | | | | |
| Normal Operation | 74 m³ | 3000 kg | 100 days | Powdered resin with corrosion products |
| Cooling Water Break-In | 74 m³ | 3000 kg | 10 days | Powdered resin with corrosion products |
| b) Containers 104 and 105 | 10 m³ | 20 kg | 5 days | Powdered resin with corrosion products |
| c) Container 102 | 4.5 m³ | 144 kg | 1 day | See Table II |
| d) Container 103 | 8 m³ | 3000 kg | 90 days | See Table II |
| 2. Evaporation Concentrate | | Evaporation Residue | | |
| Container 106 | 2.5 m³ | 360–620 kg | 10 days | See Table III |

*Period is defined as the normal supply period of the concentrates.

Table II

Filter Concentrate Compositions (neutral or slightly alkaline)

| Name | Chemical Identity and Form; wt.–% | | Particle Size | Distribution in wt.–% | Relative Amount in any given concentrate in wt.–% |
|---|---|---|---|---|---|
| Kieselguhr filter aid | $SiO_2$ | 89.6% | 2 – 6 μ | 1% | up to 55% |
| Celite 545 | $Al_2O_3$ | 4.0% | 6 – 10 μ | 5% | |
| | $Na_2O$ & $K_2O$ | 3.3% | 10 – 20 μ | 18% | |
| | | | 20 – 40 μ | 52% | |
| | | | 40 – 60 μ | 16% | |
| | granular | | 60 μ | 3% | |
| Activated carbon filter aid | comminuted charcoal granular | | 10 – 300 μ | | up to 15% |
| Synofils Solkaflocken BW 100 | fine cotton hairs | | | | up to 10% |
| Heavy metal hydroxides or hydrated oxides | $Fe(OH)_3$ $Mn(OH)_2$ $Co(OH)_2$ – flocculent $Ni(OH)_2$ $Cr(OH)_3$ | | 60/μ | 96% mainly iron | up to 50% |
| | dispersed hydroxides | | 1 – 20 μ | 4% mainly chromium and nickel | |
| Mixed bed filter resins | Carboyl synthetic resin ion exchanger, bead shaped | | 1.2 mm | 1% | |
| | | | 0.8–1.2 | 15% | |
| | | | 0.34–0.8 | 83% | |
| | | | 0.34 | 1% | up to 30% |
| Powdered resin | comminuted mixed bed filter material | | 0.05 mm | | up to 10% |
| Calcium - Silicon & Aluminum oxides or Calcium & Aluminum silicates | $CaO.SiO_2+Al_2O_3$ granular (concrete dust) | | 20 – 100 μ | | up to 100% |
| Dust and small amounts of oil | (soot) oil | | | | up to 1% up to 0.1% | where $\mu = 10^{-6}$ meters

TABLE III

Composition of Evaporation Concentrate (alkaline pH of about 10)

1. Composition of the solids (at 20° C)
Amount of solids = 8.3 g/100ml

| Name | Chemical Formula | Particle size | Fraction in wt.–% |
|---|---|---|---|
| Sodium sulfate | $Na_2SO_4$ granular | about 20 μ | 11 |
| Calcium sulfate | $CaSO_4$ granular | about 20 μ | 40 |
| Heavy metal oxides | e.g. $Fe_2O_3$ (primarily) +CuO granular | 12 – 60 μ *) | 18 *) |
| Calcium phosphate | $Ca_3(PO_4)_2$ flocculent | | 30 *) |
| Calcium -, silicon-, Aluminum-oxides or Calcium-& Aluminum-silicates (concrete dust) | $CaO - SiO_2$ $Al_2O_3$ granular | 10 – 100 μ | 10 *) |

2. Composition of the dissolved material
Evaporation residue = 8.27 g/100 ml

| Name | Chemical symbol | Fraction in wt.–% |
|---|---|---|
| Sodium | Na | up to 20 *) |
| Magnesium | Mg | up to 10 *) |
| Calcium | Ca | up to 20 *) |

TABLE III-continued

Composition of Evaporation Concentrate (alkaline pH of about 10)

| | | |
|---|---|---|
| Potassium | K | up to 2 *) |
| Sulfate | SO$_4$ | up to 80 *) |
| Chloride | Cl | up to 30 *) |
| Iron | Fe | up to 20 *) |
| Copper | Cu | up to 6 *) |
| Nickel | Ni | up to 2 *) |

*) approximate values
$\mu = 10^{-6}$ meters

The concentrates in containers 101, 102, 104 and 105 have a salt content lower than that of concentrate in container 106 and particles of a size smaller than the particle size of the resin-beads in container 103.

The concentrates from containers 101 through 105 can be independently [by individually controllable valves (not shown)] fed through pipelines 160 to 166 (to obtain any desired mixture in container 109 or in vessel 120) and either through pipeline 167 to intermediate storage container 109 or through pipeline 181 to vessel 120. Residue and used powdered resin from powdered-resin ion exchange filters (for cleaning condensate and reactor water) are collected in containers 101, 104 and 105 and fed into vessel 120. Unfiltered wash water from nuclear plant 180 is conducted directly through pipeline 179 to vessel 120 (without passing through a mechanical filter, such as that in the wash water column which provides residue collected in container 102). After mixing the unfiltered wash water with the powdered stored resin (from containers 101, 104 and 105) in a ratio of 2 parts by volume of wash water per part by volume of stored resin, the contents of vessel 120 are fed through pump 182 into pipeline 169 to residue filter 111.

Stirrer 110 serves to mix the concentrates fed into container 109. From container 109, the resulting mixture is fed through pipeline 169 by pump 168 to a filter-cake-producing filter 111. This filter 111 is made of a number of plate-shaped elements 113 carried by a vertical, hollow shaft 112. Filter cake forms on the upper sides of the plates. The filtrate is drawn off through the hollow shaft 112 and pipelines 134, 138 and 139 and drained into storage vessels or passed to further water treatment and then recycled.

An example of filter 111 is a steam-heated filter obtainable under the designation "Funda-Rueckstandsfilter $^{R10}$" from Chemap AG, Maennedorf/Zuerich, Alte Landstr. 414. Another example of filter 111 is that described on pages 19–72 and 19–73 of "Chemical Engineers' Handbook", by John H. Perry, McGraw-Hill Book Co., New York (4th Ed., 1963) under the heading "The Rodney Hunt Pressure Filter".

In order to prevent radioactive solids from getting into the filtrate, filter 111 is first provided with a precoat of fibrous material, such as cellulose fiber, before actual filtration begins. To this end, there is provided a precoat tank 114 connected in an auxiliary circuit. The fibrous material is first thoroughly mixed with water in the precoat tank; then, this fiber-laden water is pumped by pump 137 into the filter while a suction is being applied to shaft 112, whereby the precoat is formed on the filter cloths or septa of the elements 113. An example of a suitable fibrous material is clean, fibrous cellulose material designated as Type BW 100 (cotton fibers of one millimeter length). During drying, this cotton fiber precoat gives an effect equal to a paper filter and acts to filter out aerosols.

The cotton fibers are added to water in tank 114 until they amount to 3 to 4 weight-% of the weight of the water. A homogenizing period during which the fiber-water mixture is circulated through the filter and the precoat tank via pipelines 134, 135 and and 136 by pump 137 assures a uniform precoat layer thickness of about 0.8 millimeter.

Residue filter 111 thus both filters the unfiltered wash water and dewaters concentrated residue from nuclear plant separators. The powdered stored resin (mixed with the unfiltered wash water) serves as an auxiliary filter aid.

The solids in container 109 can only contain up to 25 weight-% resin beads from container 103. Exceeding this limit leads to an unstable filter cake from which the resin beads can fall during dewatering and drying. Under this limit, the resin beads become securely embedded with the other waste solids in the filter cake and are held there throughout dewatering and drying.

When an economical filter cake load has been built up on elements 113, any remaining, unfiltered slurry remaining in filter 111 is circulated back to container 109 through pipeline 144 and dewatering and drying is then carried out in a two-phase process. First, the excess water is blown out of the filter cake with a flow of 20° C air equal to a flow rate of 200 standard cubic meters per hour per square meter of filter area, where the conditions for the standard cubic meter are 0° C and 760 mm Hg. When the removal of liquid water has substantially ceased, the filter cake is dried with a flow of 120° C air equal to a flow rate of 70 standard cubic meters per square meter of filter area per hour.

Air is brought into filter 111 by blower 122 through conduits 141 and 142 and 143. Electrical air heater 123 raises the temperature of the air for the second phase of the dewatering and drying process. Air is exhausted through lines 134 and 138 and conduit 140. Air cooler 124 removes any condensable components from the air before it reaches exhaust chimney 133.

The dried filter cake is removed from elements 113 by rotating shaft 112 by means of motor M at 300 r.p.m. The filter cake is flung centrifugally from elements 113. Below filter 111, there is a residue bin 115 through which the dried filter cake from the filter 111 is conducted into containers 116. The bulk density of the dried powdered filter cake in the container 116 lies between 0.65 and 0.8 t/m$^3$ where t=1000kg and m = meters.

The air used during the two-phase dewatering and drying may be passed through an air filter to remove any suspended solids before exhausting it to the atmosphere.

Since the volume of stored powdered resin is less than half that of water processed in the wash water column, a washing machine program control must be effected to limit wash water collected in vessel 120 to (a) more strongly active prerinse cycle water, (b) main washing cycle water and (c) water from the first two rinse cycles, while other washing machine wash water is conducted, as before, through a mechanical filter (whose residue finally reaches vessel 102) in the wash water column. It is advisable to use completely salt-free water as the wash water so that the dosaging ratio of wash water to powdered stored resin can be substantially increased.

The relatively small volumes of concentrate coming through pipeline 158 into container 106 from the evaporation concentrator are conducted directly from container 106 through pipeline 159 into transport and storage containers 117 which have been previously attached to drying hood 118. The concentrate flow from container 106 is stopped when level indicator 119 indicates that a predetermined concentrate level has been achieved.

Hood 118 contains infrared radiators which heat the concentrate in a container 117 from above. Air flow within the hood is controlled so that it passes over the liquid surface of the concentrate and withdraws vapor as it is produced by the radiators. A thermally-caused circulating of the liquid concentrate in a container 117 prevents premature crusting on the sides of the container. Maintenance of the air flow within the hood and over the surface of the concentrate makes the hood and container interior have a negative pressure, so that no vapors can escape through any leaks at the connection between hood and container.

When no liquid level remains, a post drying period is initiated to bring the moisture down to less than 30 weight-% of the total weight of dry residue. This moisture content is generally sufficient to prevent indications of fermentation and decay and to reduce the possibility of corrosion sufficiently that the filled containers can be stored for years without developing leakages. The bulk density of the powdered residue left in container 117 lies between 0.8 and 1.5 $t/m^3$, where $t =$ 1000 kilograms and $m =$ meters.

This procedure for handling evaporation concentrates is presently being used in an installation at the AEG Nuclear Energy Experimentation Center Grosswelzheim. The installation can process 10 to 20 liters of evaporation concentrate per hour.

Air flow through hood 118 comes in from conduit 130 and has been heated by heater 131. Exhaust air laden with vapor leaves through conduit 132. The exhaust air is passed through a combined cyclone/sand filter unit 190 to remove any solid or liquid particles and then is forwarded by airtight blower 121. The exhaust air then passes through dry air cooler 124, where any condensable components are removed, and thence to exhaust chimney 133. Condensate and rinse water from the cyclone/sand filter are returned to container 106.

A suitable container 116 and 117, together with lid, is set forth on page 94 of the journal "Atompraxis", Vol. 16, No. 2, 1970.

Since the concentrate resulting from cleaning the reactor water often exhibits higher radioactivities, special containers are provided for the collection. At least two containers 104 and 105 are always provided, so that alternately one and then the other can be filled, through pipelines 157 and 155 or through pipelines 157 and 156; appropriate valving (not shown) is provided, but does not constitute a material part of the subject invention. The provision of alternate containers 104 and 105 permits the selection of an optimum storage time for allowing radioactive decay to proceed partially before concentrate in container 104 or 105 (the one which is not then being filled) is forwarded to container 109 or vessel 120.

Sedimentation tanks 101 to 105 permit more complete sedimentation of solids within them and provide supernatent (clarified water) which is directly transmitted, e.g., to further water processing through pipelines 148 to 154 using pumps 170 and 171, without passing them through filter 111. This operates to reduce the work load of filter 111. The water forwarded through pipeline 153 by pump 170 goes to the sump system of the plant, while the water forwarded through pipeline 154 by pump 171 goes to the mixed bed ion exhange filters.

The method of the present invention is particularly suitable for use in connection with a nuclear power plant which operates with boiling-water reactors. Powdered resin used in such a plant for cleaning radioactive condensate is employed only to a very low level of its useful (volume) capacity, since high quality condensate is required. Such powdered resin yields a large volume of sediment or slurry (med), due to an electrostatic effect; the solids in this mud are only about between 5 and 10 percent by weight.

It will be understood that the above description of the present invention is susceptible to various modifications, changes and adaptations and the same are intended to be comprehended within the meaning and range of equivalents of the appended claims.

We claim:

1. A method for processing contaminated waste wash waters developed in a nuclear plant and containing radioactive solid substances and radioactive ionically bound dissolved substances, said nuclear plant having a resin-bead ion exchange filter, an evaporator concentrator, a powdered resin ion exchange filter which forms used ion exchange powder resin which can no longer be used in a straight-through operation and which is not completely exhausted as yet, and a washwater column for the contaminated waste wash waters, said nuclear plant forming radioactive concentrate from which liquid is removed, the concentrate comprising (a) radioactive concentrate from the resin-bead ion exchange filter, (b) radioactive concentrate from the evaporation concentrator and (c) radioactive concentrate having particles of a size smaller than that of resin beads in the resin-bead ion exchange filter and having a salt content less than that of (b), and wherein a mixture of concentrate (a) and concentrate (c) is dewatered by filtering in a filter-cake-producing filter and dried, the improvement comprising mixing the contaminated wash waters with said used ion exchange powder resin in a mixing vessel to form a suspension and remove ionically bound radioactive substances dissolved in the wash water and then feeding the resulting suspension into the filter-cake-producing filter to remove radioactive solid substances from the suspension.

2. A method as defined in claim 1 wherein a filter cake forms on the filter-cake-producing filter and the filter cake is dried in the filter-cake-producing filter and then discharged therefrom for permanent storage.

3. A method as defined in claim 1 wherein the waste wash waters are divided into waste waters which are heavily contaminated and waste waters which are weakly contaminated, and only the heavily contaminated waste waters are mixed with the used ion exchange powder resin while the weakly contaminated waters are discharged directly or subjected to separate waste water processing.

4. A method as defined in claim 3 wherein the heavily contaminated wash waters comprise wash waters from hand wash basins and washing machines and the weakly contaminated wash waters comprise wash waters from showers.

5. A method as defined in claim 1 wherein the wash waters comprise the untreated wash waters from showers, hand wash basins, and washing machines.

6. A method as defined in claim 1 wherein a basic settlement layer in the form of a precoat material of fibrous material is applied to the filter-cake-producing filter before the suspension is fed to the filter-cake-producing filter.

7. A method as defined in claim 1 wherein the suspension is fed to the filter-cake-producing filter directly after the mixing in the mixing vessel.

8. A method according to claim 7, wherein the wash water and used ion exchange powder resin are contacted for a period of from about 15 to 20 minutes in the mixing vessel.

9. A method as defined in claim 8 wherein a nuclear power plant with boiling water reactor is processed with powdered resin ion exchangers for purifying condensate of the boiling water reactor, and the powdered resin consumed for the purification of the condensate is used as the used resin for admixture to the waste wash waters.

10. A method according to claim 1 wherein said suspension is combined with the mixture of concentrate (a) and concentrate (c) before said mixture of concentrate (a) and concentrate (c) is dewatered and dried in the filter-cake-producing filter.

11. A method according to claim 1 wherein the wash water and used ion exchange powder resin are contacted for a period of from about 15 to about 20 minutes in the mixing vessel.

12. A method according to claim 1 wherein the filter-cake-producing filter comprises a plurality of plate-shaped elements carried by a vertical hollow shaft means for removing filtrate, filter cake forming on the upper sides of the plate-shaped elements during filtering.

13. A method according to claim 12 which comprises coating a precoat of fibrous material on the plate-shaped elements for filtering out radioactive solids.

14. A method according to claim 13 wherein the fibrous material is cellulose fiber.

15. A method according to claim 13 wherein the fibrous material is means for filtering out aerosols during drying.

16. A method according to claim 13 which comprises applying ion-exchange powdered resin as an auxiliary filter aid on the plate-shaped elements.

17. A method according to claim 1 wherein the waste water is salt free.

18. A method according to claim 1 wherein the waste wash water is wash water from a washing machine having at least two rinse cycles and comprises washing machine prerinsecycle water, washing machine mainwashing cycle water or washing machine rinse water from one of the first two rinse cycles.

19. A method according to claim 1 wherein the wash water to used ion exchange powder resin mixture ratio is about 2:1, by volume, at which the resin-water includes 10 percentage by weight of resin.

20. Apparatus for processing contaminated waste wash water in nuclear systems comprising at least one mixing vessel for receiving the contaminated wash waters, a first line connected to the vessel for feeding the contaminated wash water to the vessel, a second line connected to the vessel for feeding ion exchange resins to the vessel, a discharge opening in said vessel, a filter cake producing filter, a third line connecting the discharge opening with the filter, and further including:
  a system for treating various radioactive residues having a liquid component, said system having (1) an evaporation concentrator which produces radioactive residues, (2) resin bead ion exchange filters which produce radioactive residues, and (3) at least one further separating stage which produces radioactive residues and which is a mechanical filter stage, a settling tank stage or a powdered resin ion exchange filter stage,
  means for mixing the residues from the resin bead ion exchange filters with the residues from the further separating stage to form a mixture,
  means for feeding the mixture to the filter cake producing filter; and
  means for transporting the residues from the evaporation concentrator directly into transport and storage vessels.

21. Apparatus as defined in claim 20 wherein the filter includes a plurality of plate-shaped filter plates which are supported by a rotatable hollow shaft through which filtrate can be removed and a line for feeding hot air is connected to the filter.

22. Apparatus as defined in claim 20 including a residue removal device connected to the filter and a vat connected to the filter for permanent storage.

23. Apparatus as defined in claim 20 wherein the vessel has a decanting opening.

24. Apparatus as defined in claim 20 wherein two vessels are provided into which the ion exchange resins and the wash waters can be alternatingly fed under the control of a valve.

25. Apparatus as defined in claim 20 for treating waste wash waters from washing machines, wherein a valve is provided which sends the wash water from the washing cycle of the washing machine into a first waste water line and the rinse waters from the washing machine into a second waste water line, with only the first waste water line being connected with the mixing vessel while the second waste water line is connected with a separate waste water processing system.

26. Apparatus as defined in claim 25 for treating waste wash waters from showers and hand wash basins including means for feeding the waste wash waters from the showers to the second waste water line and means for feeding the waste wash waters from the hand wash basins to the first waste water line.

27. The apparatus according to claim 20 wherein the at least one further separating stage produces a radioactive residue having particles of a size smaller than that of the resin bed in the resin bed ion exchange filter and having a salt content less than that of the radioactive residue produced in the evaporation concentrator.

* * * * *